(12) United States Patent
Stavinga

(10) Patent No.: US 9,695,021 B1
(45) Date of Patent: Jul. 4, 2017

(54) GARBAGE DISPOSAL JACK

(71) Applicant: Henry A. Stavinga, Palm Harbor, FL (US)

(72) Inventor: Henry A. Stavinga, Palm Harbor, FL (US)

( * ) Notice: Subject to any disclaimer, the term of this patent is extended or adjusted under 35 U.S.C. 154(b) by 0 days.

(21) Appl. No.: 15/062,962

(22) Filed: Mar. 7, 2016

(51) Int. Cl.
| | |
|---|---|
| B66F 3/35 | (2006.01) |
| B66F 3/42 | (2006.01) |
| B66F 3/36 | (2006.01) |
| E03C 1/266 | (2006.01) |
| F16M 11/24 | (2006.01) |
| F16M 11/28 | (2006.01) |
| B66F 3/24 | (2006.01) |

(52) U.S. Cl.
CPC ............... *B66F 3/35* (2013.01); *B66F 3/247* (2013.01); *B66F 3/36* (2013.01); *B66F 3/42* (2013.01); *E03C 1/2665* (2013.01); *F16M 11/24* (2013.01); *F16M 11/28* (2013.01)

(58) Field of Classification Search
CPC ...... B66F 3/35; B66F 3/08; B66F 3/42; B66F 3/38; E03C 1/266; E03C 1/2665
See application file for complete search history.

(56) References Cited

U.S. PATENT DOCUMENTS

| | | | | |
|---|---|---|---|---|
| 1,492,159 A | * | 4/1924 | Caretta | B66F 3/35 100/211 |
| 1,590,830 A | * | 6/1926 | Jewkes | B66F 3/247 184/18 |
| 4,417,639 A | * | 11/1983 | Wegener | F15B 15/10 180/124 |
| 5,297,779 A | | 3/1994 | Collins | |
| 5,379,974 A | | 1/1995 | Slay | |
| 6,092,788 A | | 7/2000 | Simon | |
| 6,142,460 A | * | 11/2000 | Irwin | B25B 11/00 269/37 |
| 7,401,392 B1 | | 7/2008 | Ramsey | |
| 7,685,689 B1 | | 3/2010 | Del Castello | |
| 7,726,631 B2 | | 6/2010 | Noe | |
| 8,616,519 B2 | * | 12/2013 | Bacon | E04G 11/483 249/18 |
| 2006/0065881 A1 | | 3/2006 | Walton | |

OTHER PUBLICATIONS

Disposal Jack, www.fastcap.com, last accessed Jun. 15, 2015.

* cited by examiner

*Primary Examiner* — Monica Carter
*Assistant Examiner* — Seahee Yoon
(74) *Attorney, Agent, or Firm* — Larson & Larson, P.A.; Patrick A. Reid; Justin P. Miller

(57) ABSTRACT

Disclosed is an improved garbage disposal jack for use in the installation and removal of sink mounted garbage disposals. The improved garbage disposal jack allows for rotation of the garbage disposal unit while maintaining the height during the installation or removal process.

19 Claims, 12 Drawing Sheets

GARBAGE DISPOSAL JACK

FIELD

The disclosed device relates to the field of adjustable support devices. More particularly, the disclosed device is an adjustable jack stand for use installing and removing sink-mounted garbage disposal units.

BACKGROUND

Jack stands have been employed for many years as temporary supports during various tasks requiring mechanical work. One activity where jack stands have been helpful is installation and removal of garbage disposal units.

Due to the limited space under a kitchen sink, installing or removing a garbage disposal unit is often a one-person task. In addition to the limited space, garbage disposal units are bulky and heavy, which make installation and removal difficult and uncomfortable for one person.

Furthermore, manipulating jacks or screws while the entire apparatus is underneath the sink is a difficult and tedious task. Prior art screw jack stands do not completely secure the garbage disposal unit. Specifically, when moving a nut-and-screw stand into proper position or adjusting the position, the wiggling or jarring may loosen the nut and screw that secure the elevation of the garbage disposal unit. If the nut becomes too loose to support the load atop the stand, breaking or injury may occur.

In screw-shaft jack stands, moving or adjusting the orientation of the garbage disposal unit while elevated results in the raising or lowering of the height due to twisting of the screw-shaft.

Additionally, crank-jack stands, screw-shaft stands, and nut-and-screw stands all require the user to manipulate the screws or cranks within the confines underneath the sink. Persons with back or joint problems or with arthritis will have a difficult time using fine motor skills in confined spaces.

What is needed is a garbage disposal jack that is compact, light, easy to manipulate in confined spaces, and has a safe means for maintaining the height of the garbage disposal unit.

SUMMARY

The present application discloses an improved apparatus for easily installing and removing a garbage disposal unit.

The disclosed device improves upon the prior art by providing a lighter apparatus. The disclosed device utilizes air, rather than a liquid, to control the height of the jack.

The disclosed device improves upon the prior art by making it easier to raise and manipulate the orientation of the garbage disposal unit while elevated and in the confined space under the sink.

Kitchen sinks used in construction generally come in either high or low clearance. Above counter sinks generally have a higher clearance of approximately 9 to 10 inches. Below counter sinks have a lower clearance of approximately 7 to 8 inches. The disclosed device can be used with either sink because of the adaptability of starting heights that is possible through utilizing the locking pins or the locking disc.

Additionally, the telescoping tubes result in a compact garbage disposal jack that can be easily placed in any kitchen cabinet spaces.

Finally, the disclosed device utilizes improved height maintaining mechanisms.

Now turning to a brief discussion of the operation of the disclosed device.

In order to use the disclosed device, the user first places the garbage disposal jack underneath the sink. Next, the jack is positioned underneath the garbage disposal attachment point. If necessary, the user adjusts the height maintaining mechanism to change the starting height of the support arms. In a first embodiment, the height maintaining mechanisms are locking pins in conjunction with a locking slot. In a second embodiment, the height maintaining mechanism is a locking disc in conjunction with a plurality of shaft recesses.

In the first embodiment, the height maintaining mechanism is a series of locking pins affixed incrementally along the shaft. Using the locking pins and locking slot, the user is able to adjust the starting height of the support arms. The locking pins prevent the garbage disposal unit from falling vertically and crushing the user's hands or fingers.

In a second embodiment, the height maintaining mechanism is a locking disc with a series of shaft recesses. The shaft recesses are incrementally spaced along the shaft.

The locking disc has the overall shape of a flat disk. In the center of the disk is a teardrop-shaped hole. The general shape of a teardrop includes a narrow area and a wide area.

Moving the locking disc horizontally along the cap such that the shaft aligns with the wide area of the teardrop-shaped hole allows for the shaft height to be adjusted. After the shaft is raised to the desired height, the locking disc is moved horizontally across the cap so that the shaft recess corresponding to the desired height is aligned with the narrow area of the teardrop-shaped hole.

One benefit of the locking disc is the ability of the shaft to rotate a full 360 degrees without causing a decrease in height.

Next, the garbage disposal unit is placed upon the support arms. Then, the user inflates the air bladder to raise the garbage disposal unit up to the garbage disposal attachment point.

BRIEF DESCRIPTION OF THE DRAWINGS

The disclosed device can be best understood by those having ordinary skill in the art by reference to the following detailed description when considered in conjunction with the accompanying drawings in which.

DETAILED DESCRIPTION

Figure 1:
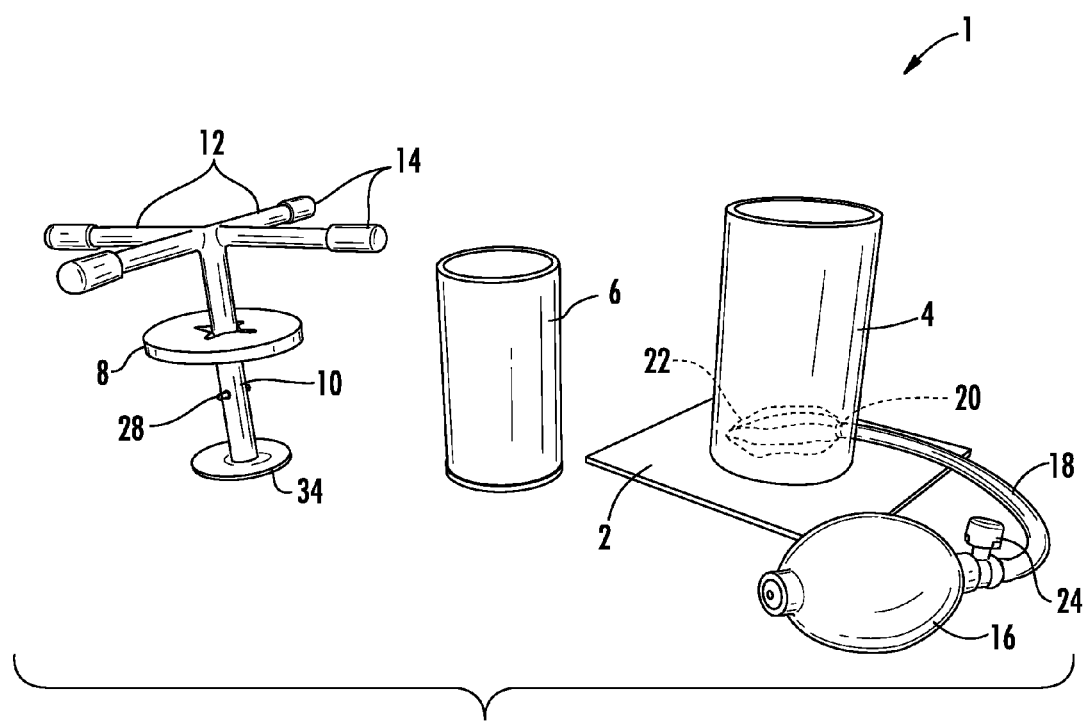
FIG. 1 illustrates an exploded view of a first embodiment of a garbage disposal jack.

Reference will now be made in detail to the presently preferred embodiments of the device, examples of which are illustrated in the accompanying drawings. Throughout the following detailed description, the same reference numerals refer to the same elements in all figures.

Referring to FIG. 1, an exploded view of the component parts of the garbage disposal jack is shown. The garbage disposal jack 1 is comprised of an outer tube 4 affixed to a base 2. The outer tube 4 is hollow allowing an inner tube 6, or a series of inner tubes (not shown), to fit inside. A cap 8 tops the tubes and has a hole allowing a shaft 10 to pass through the cap 8, and the bottom of the shaft is inside the inner tube 6. The shaft 10 has a flat bottom portion 34 that has smaller diameter than the hollow inside of the inner tube 6. By having the flat bottom portion 34 nearly as wide at the hollow inside of the inner tube 6, the shaft 10 remains perpendicular to the base 2.

Opposite the flat bottom portion 34, the shaft 10 has perpendicularly affixed support arms 12. The support arms 12 are configured to hold a garbage disposal unit. The shaft 10 also has a plurality of locking pins 26, 28 (not shown). Optionally, the support arms 12 have friction members 14 on the tips to prevent sliding of the garbage disposal unit.

Attached to the outer tube 4 is an air tube 18 and air pump 16. The air tube 18 terminates in a nozzle 20 that is configured to pass through a hole in the outer tube 4 near the base 2. The nozzle 20 is attached to an air bladder 22 located inside the hollow space of the outer tube 4. The inner tube 6 rests atop the air bladder 22 and rises when the air bladder 22 is inflated.

The garbage disposal jack 1 further includes a pressure release valve 24 that allows for fine adjustment after inflation. The fine adjustment created by the combination of an air bladder 22 and a release valve 24 makes it easy to use the garbage disposal jack 1 over a wide range of incremental heights.

Figure 2:
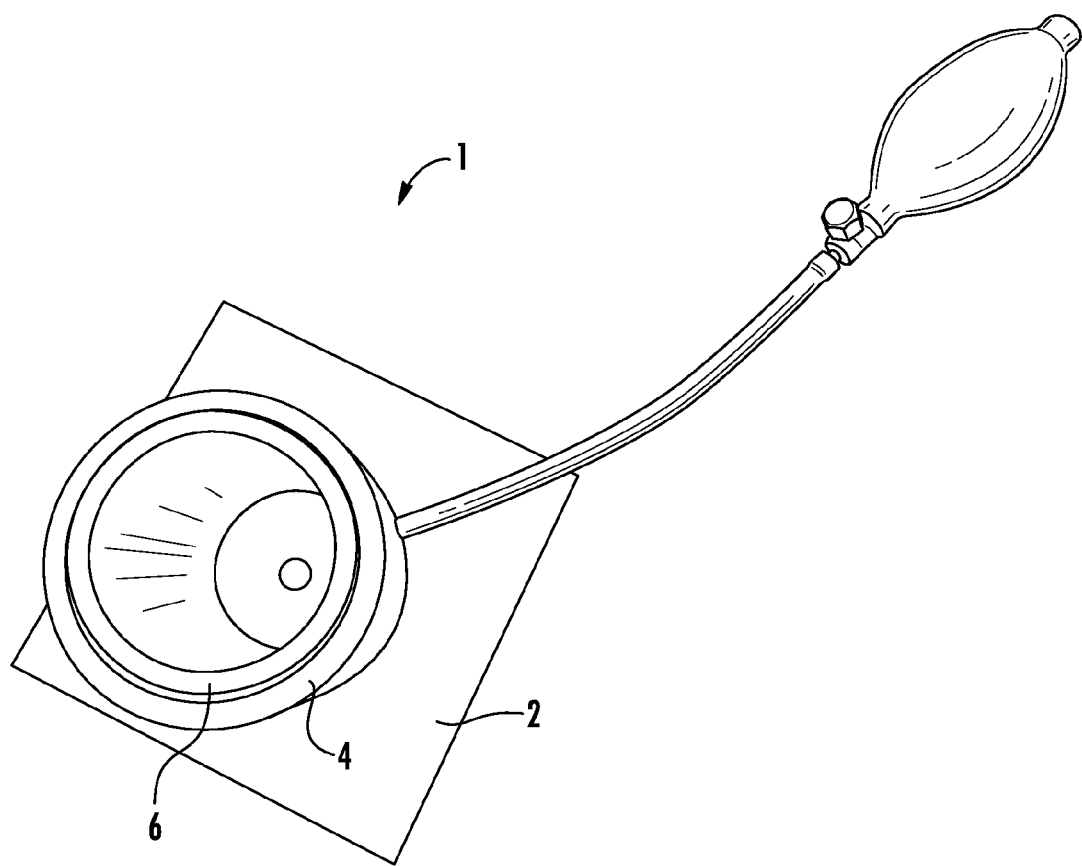
FIG. 2 illustrates the telescoping relationship between the inner and outer tubes in the first embodiment.

FIG. 2 is a top perspective view of the inner tube 6 and outer tube 4 with the cap 8 and shaft 10 removed. FIG. 2 shows the telescoping relationship between the inner tube 6 and the outer tube 4. When the air bladder is completely deflated the tops of both the inner tube 6 and the outer tube 4 are aligned.

Figure 3:
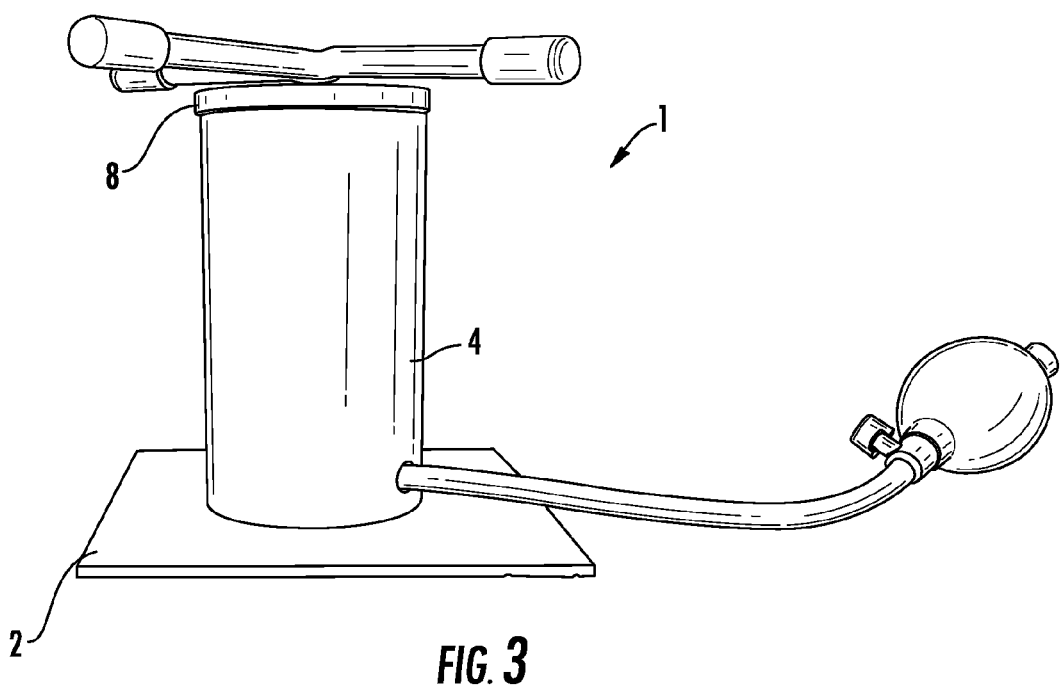
FIG. 3 illustrates a fully constructed garbage disposal jack of the first embodiment.

FIG. 3 shows the garbage disposal jack 1 when the component parts are combined into the first embodiment. The inner tube 6 is situated inside the outer tube 4. The shaft 10 passes through the cap 8. The flat bottom portion 34 slides into the inner tube 6. And the cap 8 is attached on top of the inner and outer tubes.

Figure 4:
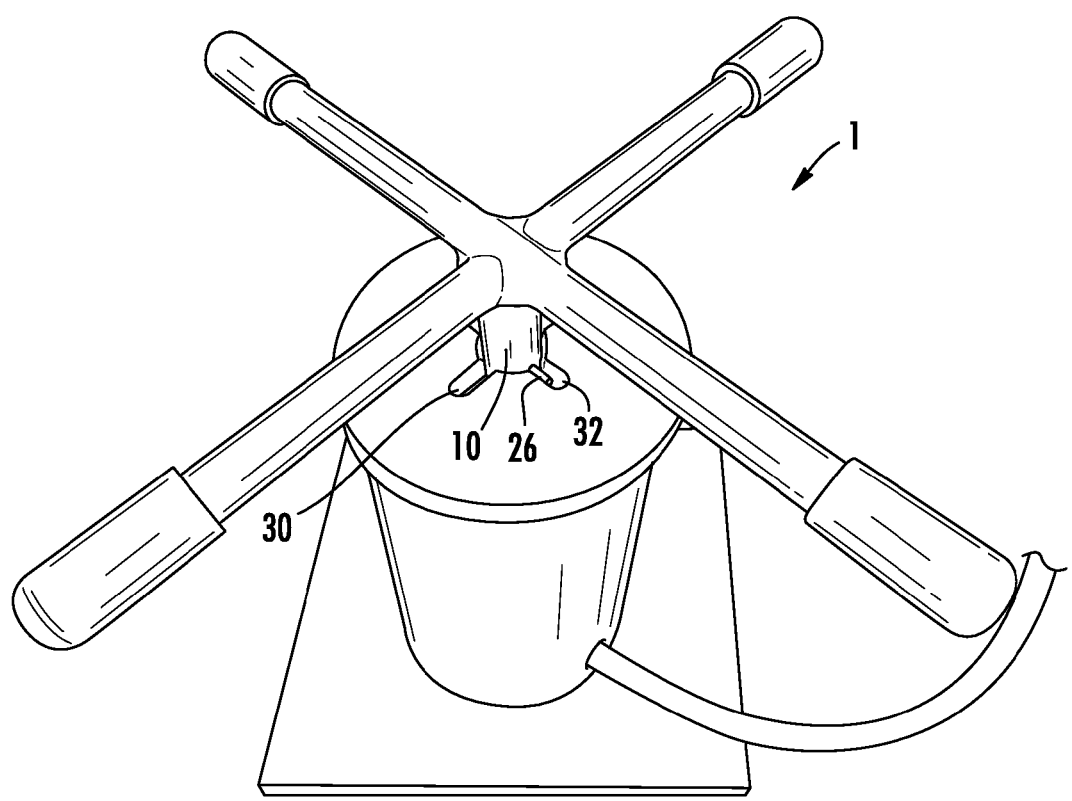
FIG. 4 illustrates a top perspective view showing the locking slot and the through slot in the cap of the first embodiment.

Referring now to FIG. 4, a top perspective view of the garbage disposal jack 1 shows a unique feature of the cap 8 of the first embodiment. In the opening through which the shaft 10 passes are a through slot 30 and locking slot 32. Shown in FIG. 4 is the first locking pin 26 engaged with, or resting in, the locking slot 32.

Generally, the locking pins 26/28 and locking slot 32 allow for variations in the starting height of the garbage disposal jack 1. A plurality of locking pins can be spaced along the shaft 10 at various increments. The greater the number of locking pins on the shaft 10, the more starting heights on the garbage disposal jack 1. Adjusting the starting height is discussed below.

Now turning to a discussion of adjusting the height of the garbage disposal jack 1 using the locking pins 26/28, the through slot 30, and the locking slot 32.

Figure 5:
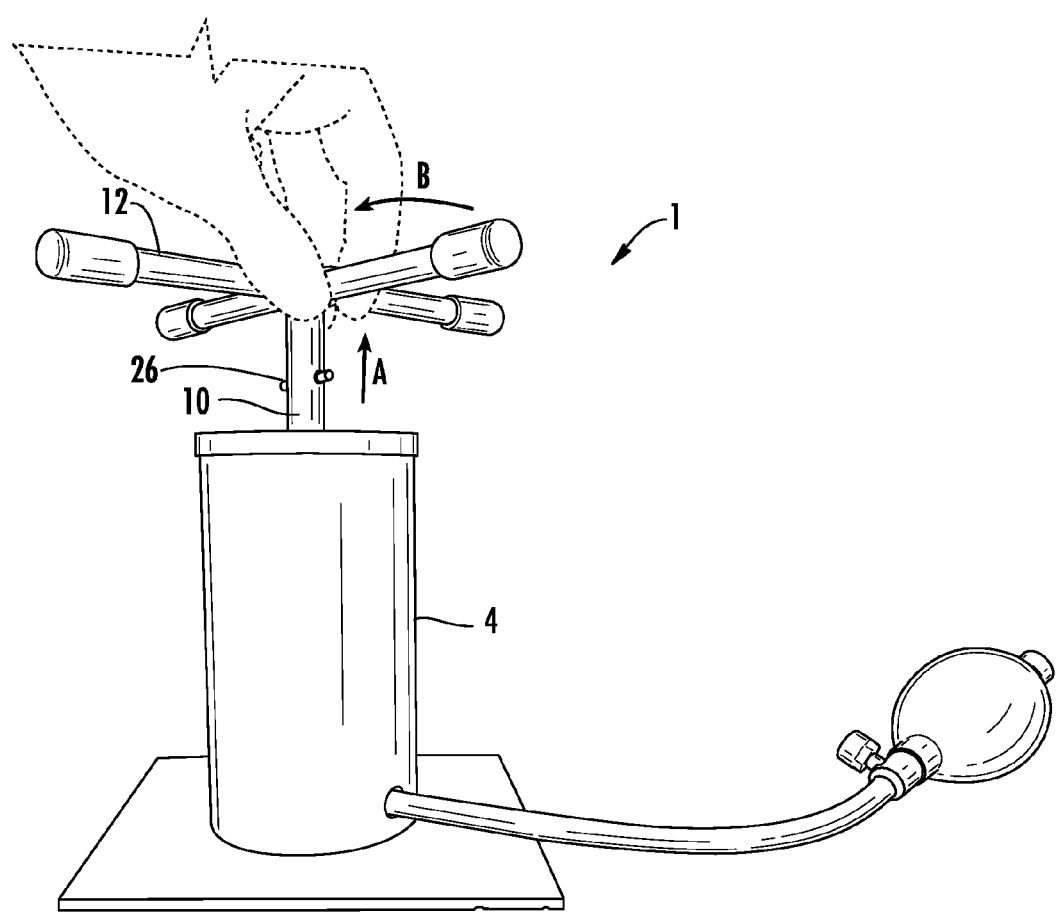
FIG. 5 illustrates height adjustment of the first embodiment using the first locking pin.

FIG. 5 shows how one adjusts the height of the shaft 10 using the locking pins 26/28. The shaft 10 is lifted by the user. The shaft 10 can be elevated to a higher starting point by aligning the first locking pin 26 with the through slot 30. To secure the shaft 10 using the first locking pin 26 and cap 8, lift up (arrow A) and twist the shaft 10 ninety degrees (arrow B) in either direction. This aligns the first locking pin 26 with the locking slot 32.

Figure 6:
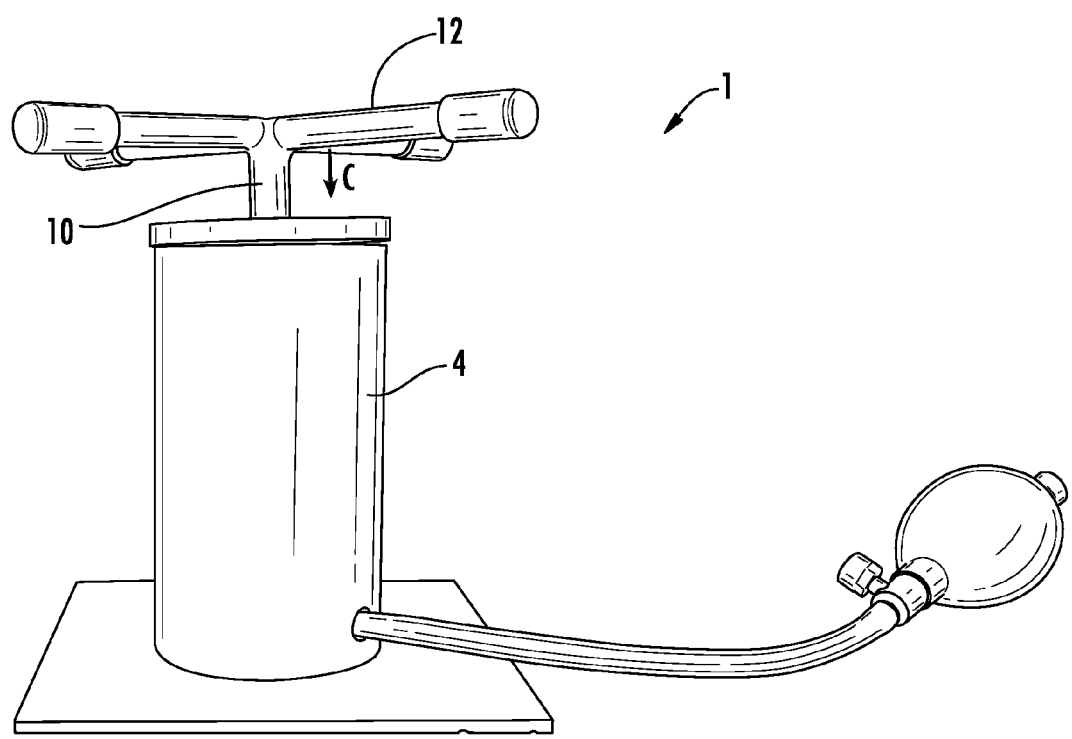
FIG. 6 illustrates the first locking pin engaging the locking slot of the first embodiment.

Now turning to FIG. 6 where setting the starting height of the first embodiment is completed. With the first locking pin 26 aligned with the locking slot 32, the shaft 10 is lowered until the first locking pin 26 rest in the locking slot 32 (arrow C).

Figure 7:
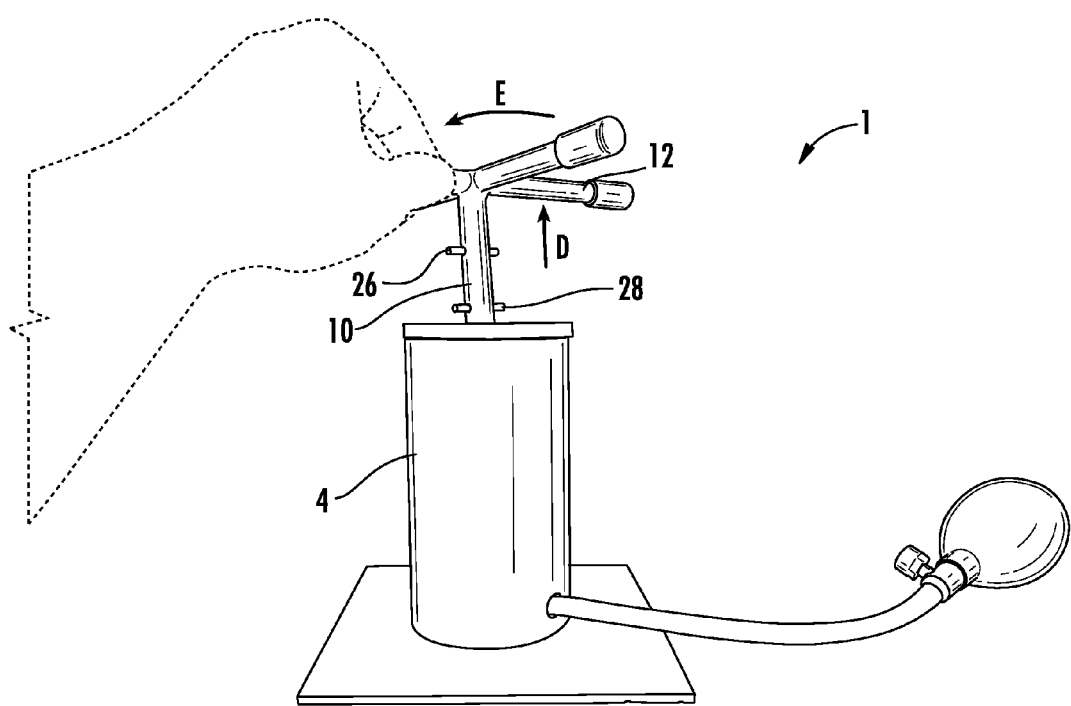
FIG. 7 illustrates height adjustment of the first embodiment using the second locking pin.

FIG. 7 shows the next upward adjustment of the starting height of the first embodiment. First, the shaft 10 is lifted to disengage the first locking pin 26 from the locking slot 32 (arrow D). Next, the shaft 10 is turned ninety degrees to align the second locking pin 28 (not shown) with through slot 30 (arrow E). After the second locking pin 28 is clear of the cap 8, the second locking pin 28 is aligned with the locking slot 32 by twisting the shaft 10 ninety degrees in either direction. Finally, FIG. 8 shows how the shaft 10 is lowered until the second locking pin 28 rests in the locking slot 32 (arrow F).

Figure 8:
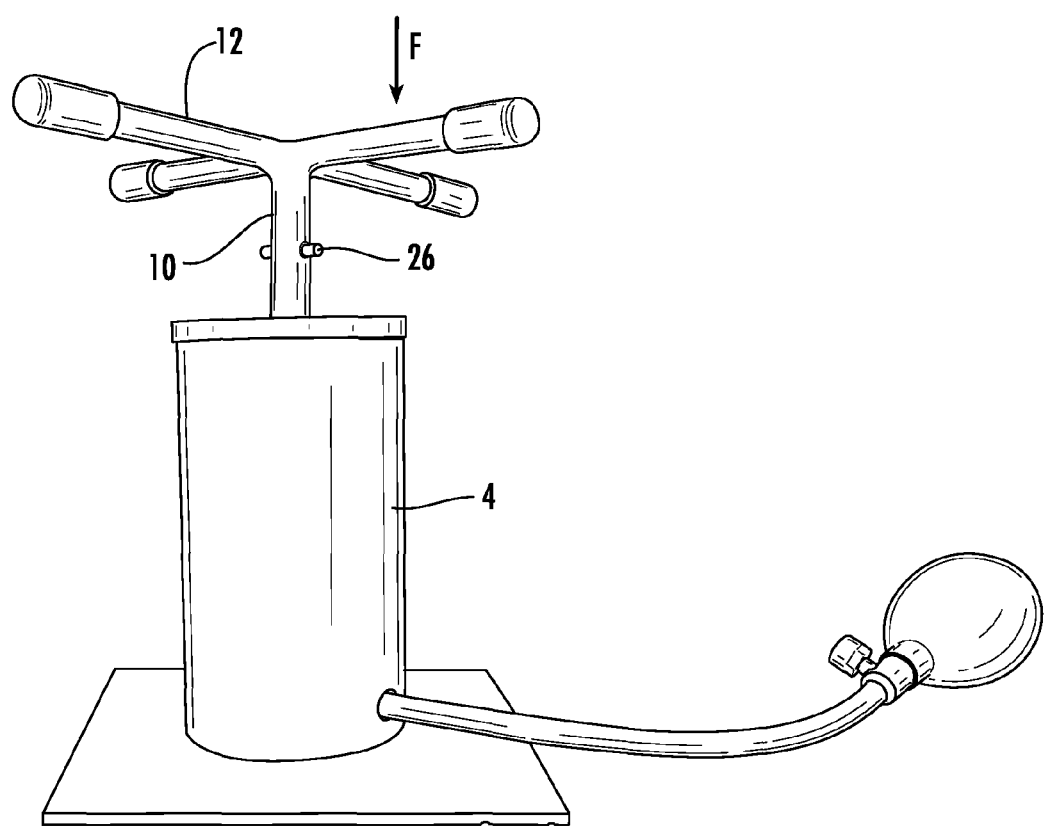
FIG. 8 illustrates the second locking pin engaging the locking slot of the first embodiment.

In FIGS. 7 and 8, the first embodiment of the device is shown with only two locking pins. This is for the purpose of explanation of the device and is not intended to limit the number of locking pins that can be present on the shaft.

Now turning to a discussion of adjusting the height of the garbage disposal jack 1 using the air bladder 22.

Figure 9:
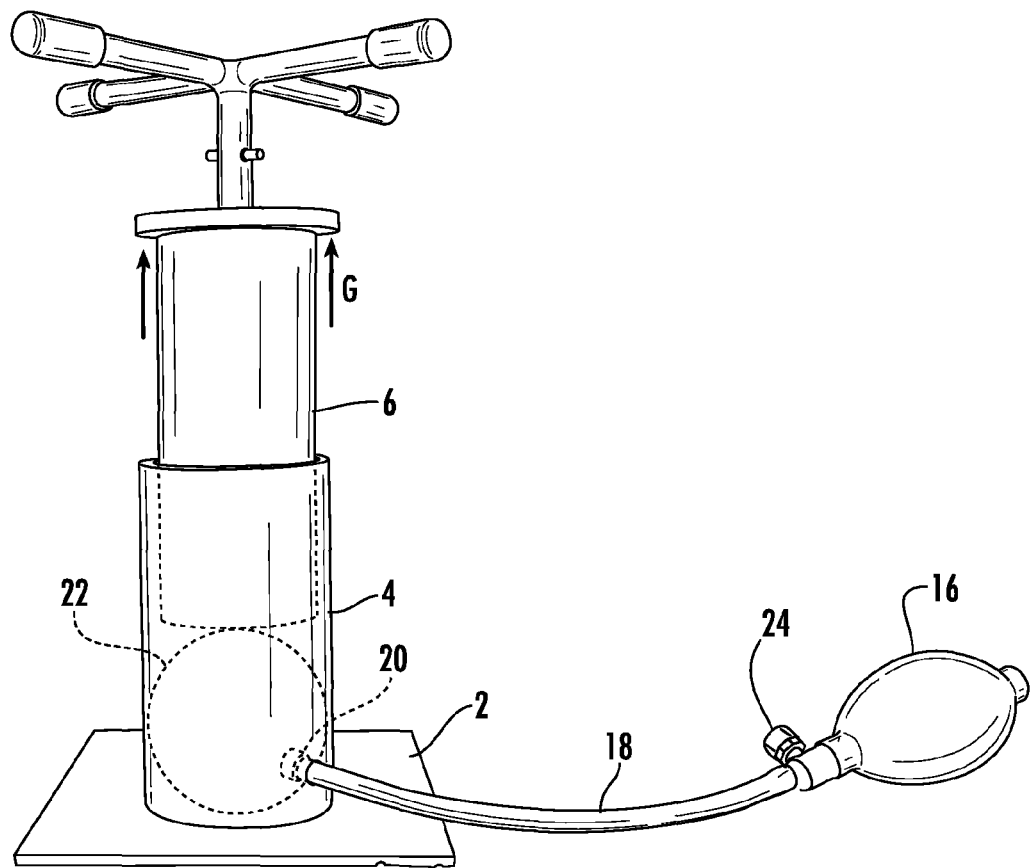
FIG. 9 illustrates height adjustment of the first embodiment using the air bladder.

FIG. 9 illustrates the air bladder adjustment of the garbage disposal unit. After setting the desired starting height of the locking pins, the air bladder 22 is inflated to provide fine adjustment of the height (arrow G). In FIG. 9, the second locking pin 28 is engaged in the locking slot 32 but the air bladder adjustment is performed the same way whether the shaft 10 is completely lowered or set at the first locking pin 26 or any subsequent locking pin. The air bladder 22 controls the telescoping relationship of the inner and outer tubes. Inflating the bladder 22 extends inner tube 6 outward and upward from outer tube 4.

The air bladder 22 is inflated by the air pump 16. The air pump 16 inflates the air bladder 22 by injecting air through the air tube 18, then air passes through the nozzle 20 into the bladder. The air pump 16 also has a release valve 24. The release valve 24 allows the air bladder 22 to be slowly deflated by releasing air from inside the bladder in a controlled manner. Utilizing the air bladder 22 and release valve 24 provides a wide range of heights over which the garbage disposal jack 1 is useful.

Figure 10:
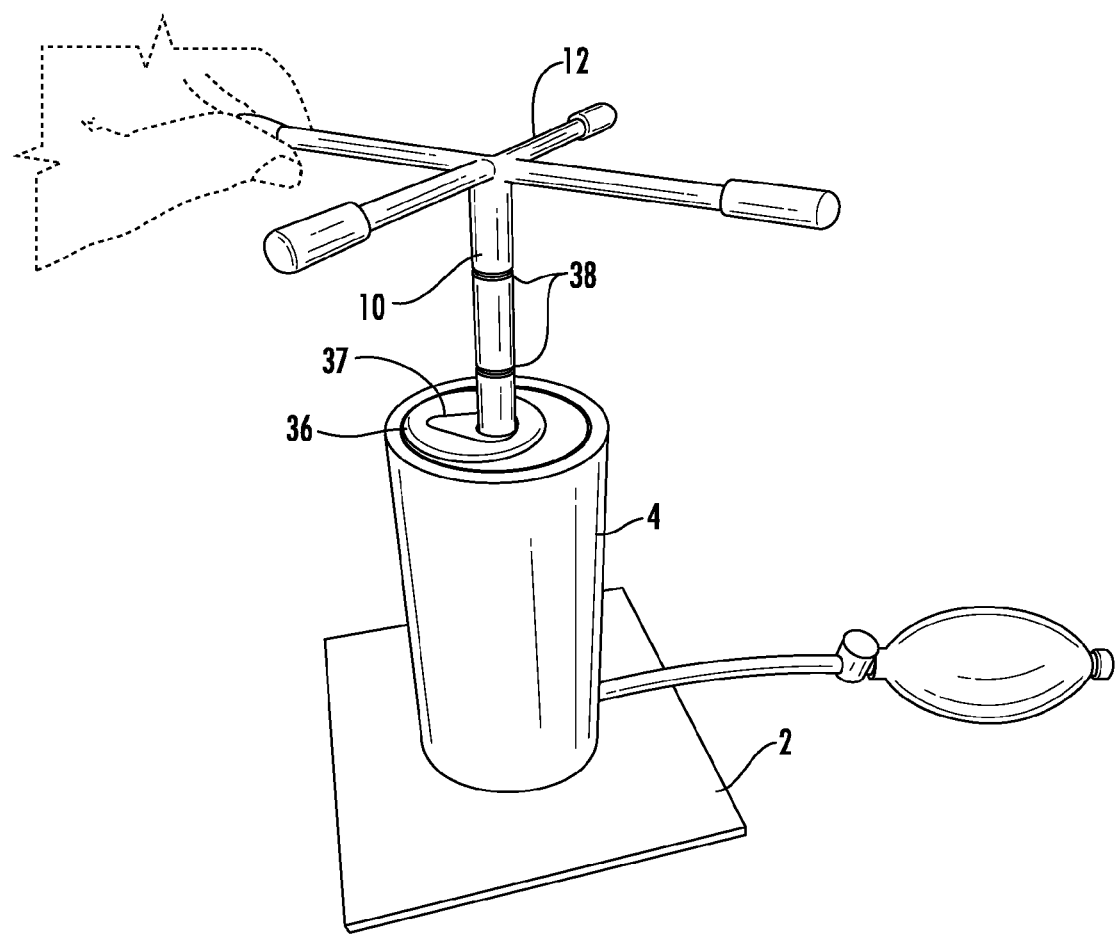
FIG. 10 illustrates a second embodiment of a garbage disposal jack utilizing a locking disc.

Now turning to a discussion of the second embodiment. FIG. 10 illustrates the starting height adjustment of the second embodiment of the garbage disposal jack 1. In the second embodiment, a locking disc 36 and recess 38 are used, instead of locking pins 26/28 and a locking slot 32, to secure the height of the shaft 10 and support arms 12.

The locking disc 36 has a teardrop-shaped hole 37 that fits around the shaft 10 and rests upon the cap 8. The shaft 10 passes through the wide area of the teardrop-shaped hole 37.

In the second embodiment, the shaft 10 has at least one recess 38. The width of the locking disc 36 is sized to fit in the recesses when the narrow area of the teardrop-shaped hole 37 in the locking disc 36 is moved into locking position.

Figure 11:
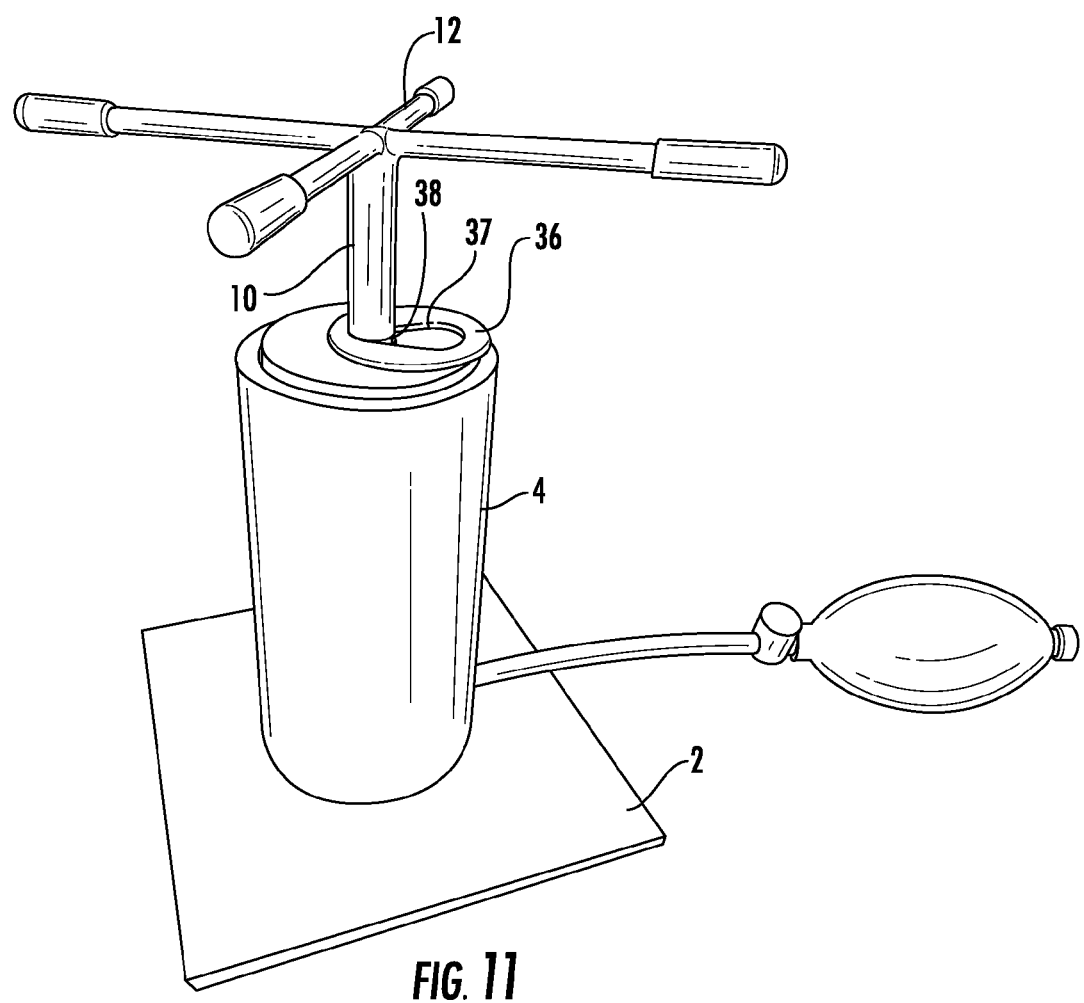
FIG. 11 illustrates the locking disc maintaining the height of the shaft and support arms in the second embodiment.

Turning to FIG. 11, the shaft 10 is locked in place by sliding the locking disc 36 horizontally across the cap 8 until the recess 38 of the shaft 10 engages the narrow area of the teardrop-shaped hole 37 in the locking disc 36.

Figure 12:
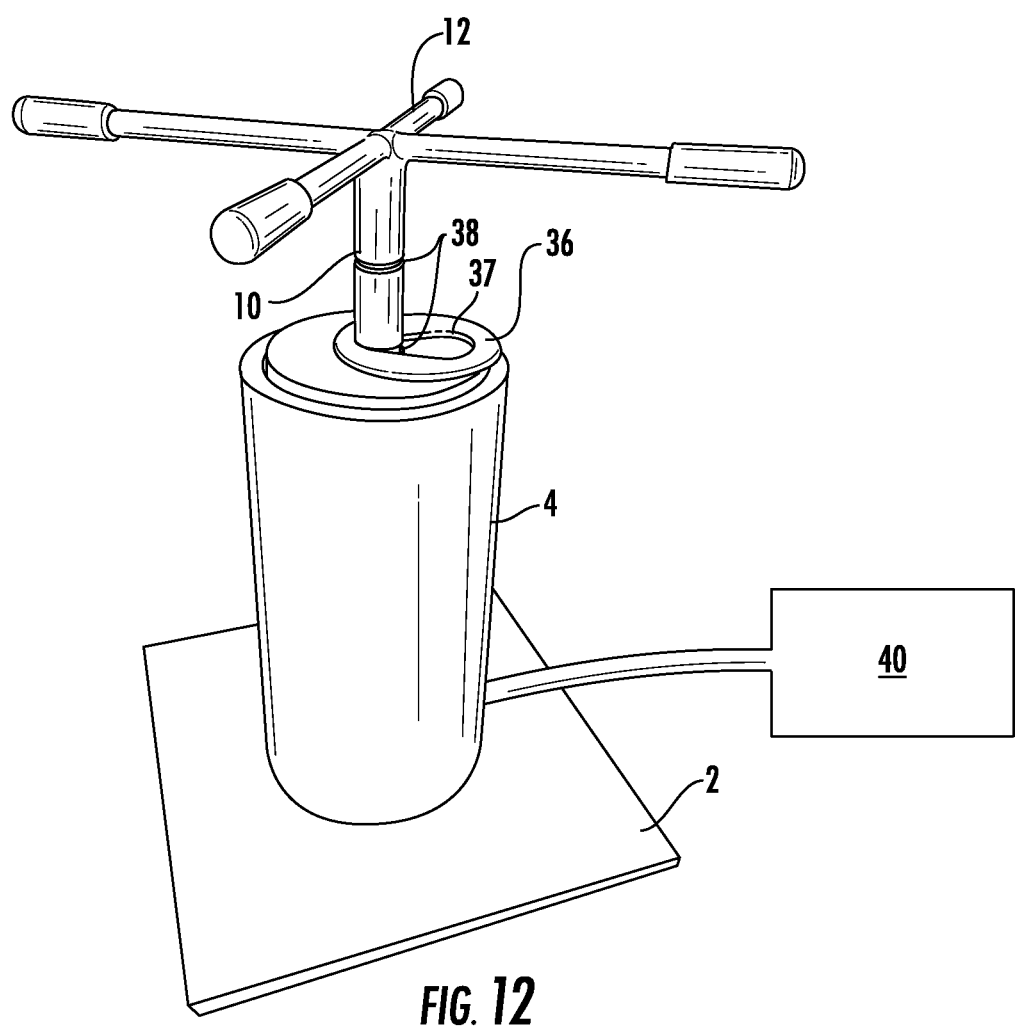
FIG. 12 illustrates a third embodiment of the garbage disposal jack where the air bladder is inflated by an electric motor.

FIG. 12 illustrates a third embodiment of the garbage disposal jack where the air bladder is inflated by an electric motor.

A manual air pump 16 is shown in FIGS. 1 through 11 and an electric motor 40 is shown in FIG. 12. However, the air bladder inflation may be performed by any suitable manual or automated mechanism.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the device or without sacrificing all of its material advantages. The form herein before described being merely exemplary and explanatory embodiment thereof. It is the intention of the following claims to encompass and include such changes.

What is claimed is:

1. A device to support a garbage disposal unit that allows rotation of the garbage disposal during installation comprising:
   a. a base;
   b. a shaft slidably interfaced to the base, the shaft having a plurality of shaft recesses;
   c. a head atop the shaft to support the garbage disposal unit; and
   d. a locking disc, the locking disc having a teardrop-shaped hole with a narrow area and a wide area;
   e. whereby when the narrow area of the locking disc is coupled to one of the plurality of shaft recess, height of the shaft is maintained; and
   f. whereby the locking disc slides horizontally to engage the shaft recess by aligning with the narrow area and disengage the shaft recess by aligning with the wide area.

2. The device to support a garbage disposal unit of claim 1, further comprising a plurality of telescoping tubes attached atop the base to aid in vertical elevation.

3. The device to support a garbage disposal unit of claim 2, further comprising a pneumatic apparatus for vertical elevation, the pneumatic apparatus comprising:
   a. an air bladder inside an outermost telescoping tube, and
   b. an inflation control unit attached to the air bladder by an air tube.

4. A garbage disposal jack for aid in the installation and removal of a garbage disposal unit comprising:
   a. a base;
   b. a plurality of hollow tubes attached to the base, the plurality of tubes comprised of an outer tube and an inner tube in telescoping relationship,
      i. the outer tube having a hole through which an air tube passes,
      ii. the air tube having a first end and a second end,
         1. the first end being connected to an air bladder, the air bladder located inside the outer tube and beneath the inner tube,
         2. the second end being connected to an inflation mechanism; and
   c. a cap with a hole;
   d. a locking disc situated atop the cap, the locking disc having a teardrop-shaped hole,
      i. the teardrop-shaped hole having a narrow area and a wide area;
   e. a shaft passing through the hole in the cap and through the teardrop-shaped hole of the locking disc, the shaft having a top end, a bottom end, and a plurality of recesses,
      i. the plurality of recesses located between the bottom end and the top end of the shaft;
   f. whereby when the wide area of the teardrop-shaped hole is aligned with the shaft, the locking disc is disengaged from the plurality of recesses and the shaft is permitted to move vertically; and
   g. whereby the locking disc slides horizontally across the cap, locking the shaft when the narrow area of the teardrop-shaped hole engages one of the plurality of recesses.

5. The garbage disposal jack of claim 4, wherein the inflation mechanism is a squeeze pump whereby a user inflates the air bladder by hand.

6. The garbage disposal jack of claim 4, wherein the first end of the air tube terminates in a nozzle, the nozzle connected to the air bladder.

7. The garbage disposal jack of claim 4, wherein the inflation mechanism is an electric motor that inflates the air bladder.

8. The garbage disposal jack of claim 4, wherein the top end of the shaft has a plurality of support arms extending outward.

9. The garbage disposal jack of claim 8, wherein each of the support arms is terminated by a friction member.

10. The garbage disposal jack of claim 4, wherein the bottom end of the shaft has a flat, circular portion to minimize sideways movement or wobbling.

11. The garbage disposal jack of claim 10, wherein the flat, circular portion of the bottom end of the shaft is smaller in diameter than the inner tube.

12. A garbage disposal installation tool comprising:
   a. a base;
   b. an outer tube attached to the base;
   c. an inner tube configured in telescopic relation to the outer tube;
   d. a cap atop the inner tube and the outer tube, the cap having a hole through which a shaft passes;
   e. the shaft having a plurality of recesses;
   f. a locking disc, the locking disc:
      i. resting atop the cap,
      ii. having a teardrop-shaped hole, and
      iii. the shaft passing through the teardrop-shaped hole,
      iv. whereby the locking disc can engage and disengage the shaft but always remains surrounding the shaft; and
   g. an air bladder, the air bladder
      i. inside the outer tube,
      ii. resting upon the base, and
      iii. connected to an inflation assembly.

13. The garbage disposal installation tool of claim 12 wherein the inflation assembly comprises:
   a. a nozzle,
   b. an air tube having a first end and a second end, and
   c. an air pump;
   d. the nozzle connecting the air bladder to the first end of the air tube; and
   e. the second end of the air tube connected to the air pump.

14. The garbage disposal installation tool of claim 13, wherein the inflation assembly further comprises a release valve.

15. The garbage disposal installation tool of claim 12 wherein the inflation assembly comprises an electric motor.

16. The garbage disposal installation tool of claim 15, wherein the inflation assembly further comprises a release valve.

17. The garbage disposal installation tool of claim 12, further comprising a plurality of support arms extending outward from a top of the shaft.

18. The garbage disposal installation tool of claim 17, wherein the plurality of support arms have friction members on each tip.

19. The garbage disposal installation tool of claim 17, wherein the plurality of support arms extend outwardly and perpendicularly from the top end of the shaft.

\* \* \* \* \*